United States Patent [19]

Ponce et al.

[11] Patent Number: 5,616,547
[45] Date of Patent: Apr. 1, 1997

[54] DETERGENT COMPOSITIONS CONTAINING WASH LIQUID-HYDROLYZABLE POLYIMIDE BIOPOLYMERS

[75] Inventors: Arnaud Ponce, Aubervilliers; Florence Tournilhac, Paris, both of France

[73] Assignee: Rhone-Poulenc Chimie, Courbevoie Cedex, France

[21] Appl. No.: 208,040

[22] Filed: Mar. 9, 1994

Related U.S. Application Data

[63] Continuation of Ser. No. 863,964, Apr. 6, 1992, abandoned.

[30] Foreign Application Priority Data

Apr. 15, 1991 [FR] France ................................. 91 04566

[51] Int. Cl.$^6$ ................. C11D 3/28; C11D 3/37
[52] U.S. Cl. ............. 510/230; 510/361; 510/477; 510/478; 510/480; 510/500
[58] Field of Search .............. 252/174.23, 174.24, 252/135, 90, 174, 174.19, 541, 546, 180, DIG. 2, DIG. 11, 542, 545, 524; 525/419, 420; 528/328

[56] References Cited

U.S. PATENT DOCUMENTS

| | | |
|---|---|---|
| 3,052,655 | 9/1962 | Fox ............................................ 260/78 |
| 3,637,511 | 1/1972 | Yang ........................................ 252/257 |
| 3,846,380 | 11/1974 | Fujimoto et al. ...................... 260/78 A |
| 4,428,749 | 1/1984 | Morris ........................................ 8/137 |
| 4,440,625 | 4/1984 | Go et al. ............................ 208/48 AA |
| 4,696,981 | 9/1987 | Harada et al. ........................ 525/328.2 |
| 4,911,856 | 3/1990 | Lokkesmoe et al. ...................... 252/95 |
| 4,971,714 | 11/1990 | Lokkesmoe .............................. 252/95 |
| 5,062,995 | 11/1991 | Wu et al. ................................. 252/546 |
| 5,260,272 | 11/1993 | Donachy et al. .......................... 524/12 |
| 5,266,237 | 11/1993 | Freeman et al. ........................ 252/542 |

FOREIGN PATENT DOCUMENTS

| | | |
|---|---|---|
| 3724460 | 2/1988 | Germany . |
| 1404814 | 9/1975 | United Kingdom . |
| 8703891 | 7/1987 | WIPO . |

*Primary Examiner*—Margaret Einsmann
*Assistant Examiner*—Lorna M. Douyon
*Attorney, Agent, or Firm*—Burns, Doane, Swecker & Mathis, L.L.P.

[57] ABSTRACT

Environmentally improved, storage-stable detergent compositions, having good efficacy in terms of both primary and secondary detergency, contain a surfactant and an in situ, wash water-hydrolyzable polyimide biopolymer, such polyimide biopolymer having a COO$^-$ charge density ranging from 0 to $5 \times 10^{-4}$ mol/g thereof and the at least partially biodegradable polypeptide detergent builder hydrolysate thereof having a COO$^-$ charge density of at least $10^{-3}$ mol/g thereof.

30 Claims, 2 Drawing Sheets

DETERGENT COMPOSITIONS CONTAINING WASH LIQUID-HYDROLYZABLE POLYIMIDE BIOPOLYMERS

This application is a continuation of application Ser. No. 07/863,964, filed Apr. 6, 1992 now abandoned.

BACKGROUND OF THE INVENTION

1. Field of the Invention

The present invention relates to improved detergent compositions containing a polyimide biopolymer capable of in situ wash liquor-hydrolysis into a biodegradable polypeptide builder; such improved compositions are well adopted for formulation into detergents or cleaning products in powder form.

By the term detergent "builder" is intended any constituent thereof which improves the performance of the surfactants in a detergent composition. In general, a builder elicits a plurality of functions:

(a) It effects the removal of undesirable ions, in particular alkaline earth metal (calcium, magnesium) ions, in a washing liquor, by sequestration or precipitation, to prevent the precipitation of anionic surfactants, (b) It provides a reserve of alkalinity and of ionic strength, (c) It maintains the extracted soiling and stains in suspension, (d) It prevents mineral incrustation onto the laundry during washing.

2. Description of the Prior Art

The tripolyphosphates have long been used as the builders of choice in detergent compositions and washing products. However, they are partially responsible for the eutrophication of lakes, streams, and slowly flowing water when they are not adequately removed by water purification facilities; efforts are ongoing to replace them partially or completely.

Zeolites alone cannot replace the tripolyphosphates; their action has to be reinforced by other additives.

Copolymers of acrylic acid and maleic anhydride (or their alkali metal or ammonium salts) have been proposed (European Patent No. 25,551) as incrustation inhibitors.

They present, however, the drawback of not being biodegradable in a natural environment.

SUMMARY OF THE INVENTION

Accordingly, a major object of the present invention is the provision of improved detergent compositions possessing excellent properties of primary and secondary detergency, one of the constituents of which is a polyimide biopolymer capable of hydrolysis in a washing liquor into an at least partially biodegradable builder.

By "detergent composition" is intended any detergent for washing laundry, dishwasher detergents, or any other washing product for household, industrial or institutional use.

By "washing bath" or "washing liquor" is intended the aqueous solution of detergent (detergent composition) present in the washing machine during the wash cycles. The amount of detergent typically present is that recommended by the manufacturer; it is generally less than 20 g/liter. The pH of such a solution is above 7.

Briefly, the present invention features detergent compositions comprising a particular polymer, namely, a polyimide biopolymer possessing a $COO^-$ charge density ranging from 0 to $5 \times 10^{-4}$ mol/g of polymer and attaining, in situ in the washing bath, a $COO^-$ charge density equal to at least $10^{-3}$ mol/g of polymer.

DETAILED DESCRIPTION OF THE PREFERRED EMBODIMENTS OF THE INVENTION

Figure 1:
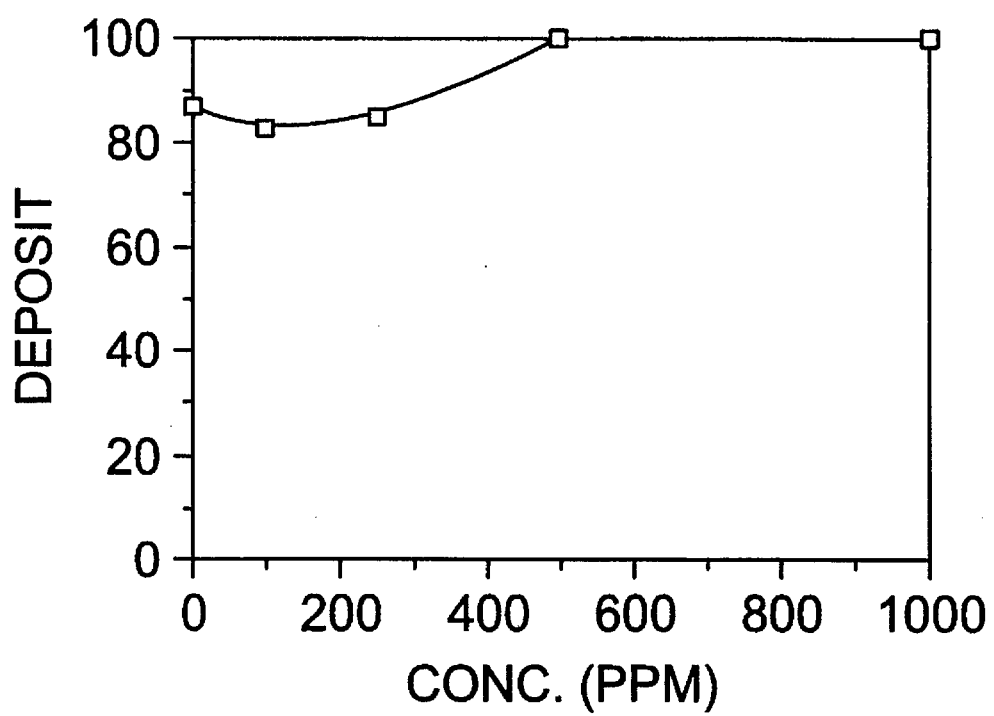
FIG. 1 is graph plotting the extent of calcium carbonate deposition versus biopolymer concentration in a detergent composition according to the present invention.

More particularly according to the present invention, exemplary such polyimide biopolymers include those prepared by the polycondensation of amino diacids, in particular aspartic or glutamic acid, or of the precursors of said amino diacids; these polymers dissolve in water at basic pH with the formation of free $COO^-$ functions.

These polymers can be either homopolymers prepared from aspartic or glutamic acid, or copolymers prepared from aspartic acid and glutamic acid in any proportions, or copolymers prepared from aspartic and/or glutamic acid and other amino acids (for example up to 15% by weight, and preferably less than 5% by weight, of other amino acids).

Exemplary amino acids which can thus be copolymerized include glycine, alanine, valine, leucine, isoleucine, phenylalanine, methionine, tryptophan, histidine, proline, lysine, arginine, serine, threonine, cysteine, etc.

The subject polyimide biopolymers advantageously have a weight average molecular weight on the order of 2,000 to $10^{+7}$, and generally on the order of 3,500 to 60,000.

These biopolymers, in particular the polyimides produced from aspartic or glutamic acid, may be prepared, in particular, by thermal condensation of said amino diacid or diacids in a substantially anhydrous medium, as described in J.A.C.S., 80, 3361 (1958), J. Med. Chem., 16, 893 (1973), Polymer, 23, 1237 (1982) or in U.S. Pat. No. 3,052,655.

Such polyimides preferably possess a zero $COO^-$ charge density; they can, however, be partially hydrolyzed (by opening of a few imide rings with the formation of alkali metal or ammonium carboxylates), the $COO^-$ charge density, however, being less than $5 \times 10^{-4}$ mol/g of polymer.

The amount of polyimide biopolymer comprising the detergent compositions of the invention advantageously ranges from 0.2% to 80%, and preferably from 2% to 5%, of the total weight of said detergent composition.

Other than the polyimide biopolymer, a surfactant is present in the detergent composition, in an amount which advantageously ranges from 2% to 50%, preferably 6 to 30%, of the total weight of said detergent composition.

Exemplary surfactants comprising the detergent compositions of the invention include:

(i) anionic surfactants of the type comprising alkali metal soaps (alkali metal salts of $C_8$–$C_{24}$ fatty acids), alkali metal sulfonates ($C_8$–$C_{13}$ alkylbenzenesulfonates, $C_{12}$–$C_{16}$ alkylsulfonates, oxyethylenated and sulfated $C_6$–$C_{16}$ fatty alcohols, oxyethylenated and sulfated $C_8$–$C_{13}$ alkylphenols), alkali metal sulfosuccinates ($C_{12}$–$C_{16}$ alkyl sulfosuccinates), etc., (ii) nonionic surfactants of the type comprising polyoxyethylenated $C_6$–$C_{12}$ alkylphenols, oxyethylenated $C_8$–$C_{22}$ aliphatic alcohols, ethylene oxide/propylene oxide block copolymers, carboxylic amides, optionally polyoxyethylenated, (iii) amphoteric surfactants of the alkyldimethylbetaine type, (iv) cationic surfactants of the alkyltrimethylammonium and alkyldimethylethylammonium chloride or bromide type.

Various additive and adjuvant constituents can additionally be incorporated into the detergent compositions of the invention in order to provide detergents or cleaning products in powder form.

Exemplary such constituents include:

(1) Builders of the type comprising:
  (a) phosphates in a proportion of less than 25% of the total weight of formulation,
  (b) zeolites up to approximately 40% of the total weight of the formulation,
  (c) sodium carbonate up to approximately 80% of the total weight of the formulation,
  (d) nitriloacetic acid up to approximately 10% of the total weight of the formulation,
  (e) citric acid, tartaric acid up to approximately 20% of the total weight of the formulation, the total amount of builder (builder-precursor polyimide + other builders) corresponding to approximately 0.2% to 80%, and preferably from 20% to 45%, of the total weight of said detergent composition, (2) Corrosion inhibitors such as silicates, up to approximately 25% of the total weight of said detergent composition, (3) Bleaching agents of the perborate, chloroisocyanate, N,N,N', N'-tetraacetylethylenediamine (TAED) type, up to approximately 30% of the total weight of said detergent composition, (4) Antiredeposition agents of the carboxymethylcellulose, methylcellulose type, in amounts ranging up to approximately 5% of the total weight of said detergent composition, (5) Anti-incrustation agents of the acrylic acid/maleic anhydride copolymer type, in an amount ranging up to approximately 10% of the total weight of said detergent composition, (6) Fillers of the sodium sulfate type for detergents in powder form, in an amount which can range up to 50% of the total weight of the detergent composition.

The detergent composition according to the present invention exhibits markedly good efficacy in respect of both primary detergency and secondary detergency. In addition, the incorporation of a polyimide which can be hydrolyzed only in the wash liquor ensures that the detergent composition has a stability on storage greater than that of a composition directly containing the biodegradable polypeptide.

In order to further illustrate the present invention and the advantages thereof, the following specific examples are given, it being understood that same are intended only as illustrative and in nowise limitative.

EXAMPLE 1

Synthesis of a polysuccinimide derived from aspartic acid:

The apparatus employed was a one-liter reaction flask heated in an oil bath, said reaction flask being surmounted by a distillation column which was itself connected to a recovery flask cooled to room temperature (distillation assembly).

250 g of L-aspartic acid were introduced into the reaction flask. The latter was purged with nitrogen; the pressure was decreased to $8 \times 10^3$ Pa. The recovery flask was maintained at 20° C. while the reaction medium was heated to 220° C. for 6 h, 30 min. The resulting water was collected in the recovery flask at 20° C.

182.2 g of a powder which was a polysuccinimide (IR spectrometry), the number average molecular weight $\overline{MN}$ of which=2,450 (viscosity measurement in 0.5N NaOH) and which possessed no anionic charge, were recovered.

EXAMPLE 2

Formulation of a detergent composition for washing laundry comprising the polysuccinimide of Example 1:

Various additives were introduced by dry mixing into the powder prepared in Example 1 in order to formulate the following detergent (washing) composition:

| Composition of the detergent | | % by weight |
|---|---|---|
| (i) | linear alkylbenzenesulfonate | 7.5 |
| (ii) | CEMUSOL LA 90 ® (polyoxyethylenated lauric acid marketed by S.F.O.S.) | 4 |
| (iii) | zeolite 4 A | 24 |
| (iv) | Na silicate ($SiO_2/Na_2O = 2$) | 1.5 |
| (v) | Na carbonate | 10 |
| (vi) | TAED | 2 |
| (vii) | Na perborate | 15 |
| (viii) | ethylenediaminetetraacetic | 0.1 |
| (ix) | polysuccinimide prepared above | 3 |
| (x) | Tinopal DMSX ® | 0.1 |
| (xi) | Tinopal SOP ® (optical bleaches marketed by CIBA-GEIGY) | 0.1 |
| (xii) | silicone antifoam | 0.2 |
| (xiii) | alcalaze | 0.15 |
| (xiv) | savinaze (enzymes) | 0.15 |
| (xv) | Na sulfate | qs 100% |

The term "control detergent" will be used to designate a detergent of the above composition, but not containing the polysuccinimide.

The performance of this detergent was tested in respect of primary and secondary detergency. These are more fully described below.

EXAMPLE 3

Performance of the detergent of Example 2 for washing laundry in respect of primary detergency:

The "primary" effects of detergency relate to the removal of soiling or stains, and were observed after a single wash.

Washing of the laundry was carried out under conditions as close as possible to actual laundering conditions, using an AEG® brand drum-type household machine.

A 5 kg load of laundry consisting of a mixture of cloths and terry towels was used as a support for control test pieces which were sewn onto the cloths.

These test pieces were fabrics soiled in standard manner and supplied by specialty laboratories.

They comprised 5 test pieces (10 cm×10 cm) of each of the following three fabrics:

Soiled cotton EMPA 101 (St-Gall) (1)

Soiled polyester-cotton EMPA 104 (St-Gall) (2)

Soiled cotton TNO (3)

The reflectance of these fabrics was measured (before they were sewn) using a XENOCOLOR® reflectometer (marketed by Dr. Lange), according to the 3 trichromatic coordinates Y, L, E.

Washing was conducted at 75° C. introducing 120 g of detergent to be tested into the receptacle of the machine (detergent concentration 8 g/l).

After drying of the laundry, all of the initially soiled test pieces were unsewn and their coordinates Y, L, E were measured again.

The differences $\Delta Y$, $\Delta L$, $\Delta E$ from the initial values indicated the detergency performance of the detergent on the various types of soilings; the differences observed are directly proportional to the detergency effect of the detergent tested.

The results for primary detergency are reported in Table I:

TABLE I

| Fabric | Reflectance | |
|---|---|---|
| | Control detergent | Detergent of Example 1 |
| (1) | $\Delta Y = 23.8$ | $\Delta Y = 26.6$ |
| | $\Delta L = 23.2$ | $\Delta L = 26.0$ |
| | $\Delta E = 23.7$ | $\Delta E = 26.5$ |
| (2) | $\Delta Y = 25.9$ | $\Delta Y = 27.8$ |
| | $\Delta L = 25.6$ | $\Delta L = 27.8$ |
| | $\Delta E = 25.8$ | $\Delta E = 28.0$ |
| (3) | $\Delta Y = 18.8$ | $\Delta Y = 21.3$ |
| | $\Delta L = 19.7$ | $\Delta L = 22.4$ |
| | $\Delta E = 20.1$ | $\Delta E = 23.3$ |

EXAMPLE 4

Performance of the detergent of Example 2 for washing laundry in respect of secondary detergency:

"Secondary" effects of detergency were observed after a series of several consecutive washes; these effects are reflected by the "redeposition" of the soiling on the initially clean fabrics, and by the "incrustation" of precipitates which can be produced during the wash, on these same fabrics.

Antiredeposition effect:

This effect was measured on 5 test pieces (10 cm×10 cm) of each of the following unsoiled fabrics:

Testfabric 405 cotton textile (4)

Krefeld cotton 10 A (5)

Mixed linen/cotton cloth (6)

DACRON white polyester (7)

These unsoiled test pieces were washed as in Example 2 in the presence of the soiled test pieces of Example 2, this being performed 5 times under the same conditions.

After each wash, the unsoiled test pieces were not unsewn. The washed soiled test pieces were replaced by other soiled test pieces, which thus constituted a fresh source of soiling for the next wash, which was carried out again under the same conditions.

The operation was repeated five times and, following this series of five consecutive washes, the initially clean test pieces were unsewn after drying.

The coordinates Y, L, E of the initially clean test pieces (4) to (7) were then measured; the differences $\Delta Y$, $\Delta L$, $\Delta E$ obtained give the cumulative "redeposition" or "greying" after 5 washes.

The results obtained are reported in Table II.

The differences in reflectance should be as low as possible.

TABLE II

| Fabric | Reflectance | |
|---|---|---|
| | Control detergent | Detergent of Example 1 |
| (4) | $\Delta Y = -3.5$ | $\Delta Y = -2.7$ |
| | $\Delta L = -1.9$ | $\Delta L = -1.5$ |
| | $\Delta E = +2.4$ | $\Delta E = +2.1$ |
| (5) | $\Delta Y = -3.9$ | $\Delta Y = -2.8$ |
| | $\Delta L = -2.1$ | $\Delta L = -1.5$ |
| | $\Delta E = +2.6$ | $\Delta E = +2.1$ |
| (6) | $\Delta Y = -3.3$ | $\Delta Y = -2.7$ |
| | $\Delta L = -1.9$ | $\Delta L = -1.5$ |
| | $\Delta E = +2.8$ | $\Delta E = +2$ |
| (7) | $\Delta Y = -13.0$ | $\Delta Y = -10.5$ |
| | $\Delta L = -7.6$ | $\Delta L = -6.1$ |
| | $\Delta E = +10.5$ | $\Delta E = +9.3$ |

Inhibitory effect on incrustation:

This effect was measured after 20 washes in the absence of soiled fabrics on the following unsoiled test pieces:

Testfabric 405 cotton textiles (4)

Krefeld cotton 12A (8)

The mineral incrustation was calculated from the ash content (in % relative to the total weight of cotton) of the fabrics washed, dried and incinerated at 950° C. for 3 hours).

The inhibitory effect on incrustation was assessed by the ratio ash content with additives/ash content without additive which is reported under the letter T in Table III below.

TABLE III

| Fabric | Ash content (%) | | T |
|---|---|---|---|
| | Control detergent | Detergent of Example 2 | |
| (4) | 3.7% | 2.4% | 65% |
| (8) | 4.1% | 1.1% | 26% |

EXAMPLE 5

This example demonstrates the capacity for sequestration of calcium ions of the polysuccinimide of Example 1, after in situ hydrolysis to polyaspartic acid in a basic medium.

The capacity for sequestration of calcium ions was measured using an electrode possessing a calcium ion-permeable selective membrane.

A calibration curve was first plotted employing 100 ml of a sodium chloride solution containing 3 g/l, pH 10.5, to which amounts of calcium ions varying from $10^{-5}$ to $3 \times 10^{-3}$ mol/l were added, and the curve of potential delivered by the electrode was plotted in terms of the concentration of free $Ca^{2+}$ ions.

The polysuccinimide of Example 1 was hydrolyzed with concentrated sodium hydroxide solution until a solution containing 20% by weight of sodium polyaspartate, pH 10.5, was obtained. The solution obtained is designated the "hydrolysate".

This solution was diluted until 100 g of aqueous solution containing 10 g/l of polyaspartate were obtained; the pH was adjusted to 10.5 with concentrated sodium hydroxide solution. 0.3 g of powdered sodium chloride was added.

The straight line:

$[Ca^{2+}]$ free/$[Ca^{2+}]$ bound=f ($[Ca^{2+}]$ free)

was plotted. From this straight line, the following were determined:

(a) The calcium ion-complexing constant K of the polymer, (b) The number So of complexing sites of the polymer, defined by:

$$\frac{[Ca^{2+}]free}{[Ca^{2+}]bound} = \frac{1}{KSo} + \frac{1}{So}[Ca^{2+}]free$$

According to this method of evaluation, it was found that the polyaspartic acid obtained by hydrolysis of the polysuccinimide of Example 1 possessed $2.5 \times 10^{-3}$ site/g of polymer, the affinity of which was Log K=3.5.

EXAMPLE 6

This example demonstrates the capacity of the polysuccinimide of Example 1 for dispersing calcium carbonate, after in situ hydrolysis to aspartic acid in a basic medium.

In a 100-cm$^3$ test tube (height 26 cm; diameter 3 cm), 2 g of precipitated calcium carbonate were dispersed in 100 ml of an aqueous solution, pH 10.5 (NaOH) containing 3 g/l of NaCl, $3 \times 10^{-3}$ mol/l of CaCl$_2$ and the hydrolysate as prepared in Example 4, at various concentrations.

The level of the deposit in cm$^3$ after 10 min. was measured, and the curve of level of deposit was plotted in terms of the concentration in ppm of the polymer (expressed on a dry basis).

The curve in FIG. 1 shows, first a flocculation phenomenon (too low a degree of coating of the particles by the polymer), then restabilization.

This capacity for stabilization of inorganic particles was especially advantageous, since it is known that the latter are the source of the incrustation phenomena due to the deposits which accumulate on cotton.

EXAMPLE 7

This example demonstrates the capacity of the polysuccinimide of Example 1 for dispersing carbon black and iron oxide (particles encountered in the commonest types of soiling), after in situ hydrolysis to polyaspartic acid in a basic medium.

1% by weight of carbon black or of iron III oxide was introduced into an aqueous solution, pH 10.5 (NaOH), containing 3 g/l of NaCl, $3 \times 10^{-3}$ mol/l of CaCl$_2$ and 1,000 ppm of the hydrolysate (expressed on a dry basis) as prepared in Example 4.

It was found that the suspensions obtained were stable over time.

In the absence of polymer, they settled in less than 10 minutes.

This capacity for stabilization of carbon black and iron III oxide was advantageous, since it is known that the phenomenon of redeposition is the consequence of poor maintenance of this type of soiling in suspension in the detergent bath.

EXAMPLE 8

This example demonstrates the property of the succinimide of Example 1 of inhibiting the crystallization of calcium carbonate, after in situ hydrolysis to polyaspartic acid in the basic medium.

The property of this product of inhibiting crystallization of calcium carbonate was demonstrated using the method described by Z. Amjad, *Langmuir*, 3, 224–228 (1987).

The measurement was carried out in a thermostated closed cell using a supersaturated solution containing $10^{-3}$ mol/l of sodium bicarbonate and $2 \times 10^{-3}$ mol/l of calcium chloride (pH 8.6), to which 5 g/l of synthetic calcium carbonate (specific surface area=80 m$^2$/g; theoretical diameter=20 nm) were added; the decrease in the rate of crystallization of the calcium carbonate, obtained by adding 500 ppm of the hydrolysate (expressed on a dry basis) as prepared in Example 4, was measured.

The results were as follows:

|  | Without polymer | With polymer |
|---|---|---|
| Rate of crystallization in mole/l.s. | $5 \times 10^{-7}$ | $4.5 \times 10^{-8}$ |

EXAMPLE 9

This example demonstrates measurement of the biodegradability of the polyaspartic acid obtained after in situ hydrolysis of the polysuccinimide in a basic medium.

The "ultimate" biodegradability of the hydrolysate as prepared in Example 5 was measured according to AFNOR Standard T90-312 (complying with international standard ISO 7827).

The test was carried out using:

(i) an inoculum obtained by filtration of inlet water of the Saint Germain municipal purification plant at Mont d'Or (Rhône), France, (ii) a test medium containing $4 \times 10^7$ bacteria/ml, (iii) an amount of test product such that the test medium contained a concentration of organic carbon on the order of 40 mg/l The degree of biodegradability of the product under test in terms of time was 75% in 28 days under the conditions of disposal in stream water.

The above examples clearly evidence all the advantages of the use, in detergent compositions, of the polysuccinimide of Example 1, namely:

(a) Its effects of primary and secondary detergency, (b) The observed builder effect following its in situ hydrolysis in a basic medium, (c) The very high biodegradability of polyanions emanating from the washing bath at the outlet of the machine.

EXAMPLE 10

Formulation of dishwasher detergent compositions from the polysuccinimide of Example 1:

Table IV below reports the composition of two dishwasher detergents C and D incorporating the polysuccinimide and a control detergent B without polysuccinimide.

TABLE IV

|  | FORMULA B | FORMULA C | FORMULA D |
|---|---|---|---|
| Na$_2$CO$_3$ | 60% | 60% | 60% |
| DISILICATE | 28% | 28% | 28% |
| PERBORATE TETRA SALT | 6% | 6% | 6% |
| SURFACTANT | 1% | 1% | 1% |
| SULFATE | 5% | 0% | 0% |
| POLYMER | 0% | PSI: 5% | PA: 5% |

PSI: Polysuccinimide
PA: Poly(sodium acrylate) M = 2,100 g/mol
Surfactant: Pluronic L 64 ®

The mixtures were prepared by dry mixing in a Lödige mixer. All the powders were incorporated, and then mixed for approximately 5 minutes. The surfactant was then slowly introduced into the mixture via a dropping funnel. The detergent obtained was fluid and did not aggregate in lumps. Its density was 1.05 g/cm$^3$ and the pH of a 10% detergent solution was 11.

The selected formula was intentionally a formula which deposited a substantial bloom on the slabs. This was due to the massive presence of carbonates and to the absence of complexing agents such as citrate.

EXAMPLE 11

This example evaluates the antifilming capacity of the dishwasher detergent compositions of Example 10.

Apart from the actual washing, namely, the removal of soiling deposited on cooking or feeding utensils, the appearance of glasses is definitely the feature of which the user is made most aware. The quality of the rinse and of the drying are thus predominant. It is customary to use the term filming or spotting to characterize these defects in appearance.

The experiments were carried out in a MIELE G 560® automatic dishwasher possessing a short program at 65° C. with a final hot rinse and a drying. The total duration of the cycle was approximately 50 minutes. No rinsing product was used.

A sequence of consecutive washing/drying runs was then performed on a series of 10 glass slabs measuring 20 cm×20 cm. Initially, the glassware was clean and free from defects. At the start, the softener incorporated in the machine was fully regenerated.

During the first washes, the hardness of the water was low and did not change with the number of consecutive washing runs. Then, when the water softener reached the end of its ability to function, the hardness of the water increased and a film began to appear on the glass slabs. During the washes, the hardness of the rinsing water and the changes in the transparency of the glass slabs were monitored.

The appearance of the glassware was measured every other wash using a GARDNER® spectrometer, superposing a black slab on the glass slab to be measured. In this manner, the increase in opacity of the bloom was monitored by the parameter L measured in the GARDNER® spectrometer. The higher the value of L, the more substantial the bloom. 20 measurements were carried out on each slab.

After these measurements were made, the value of L was plotted on a graph in terms of the hardness of the water.

Figure 2:
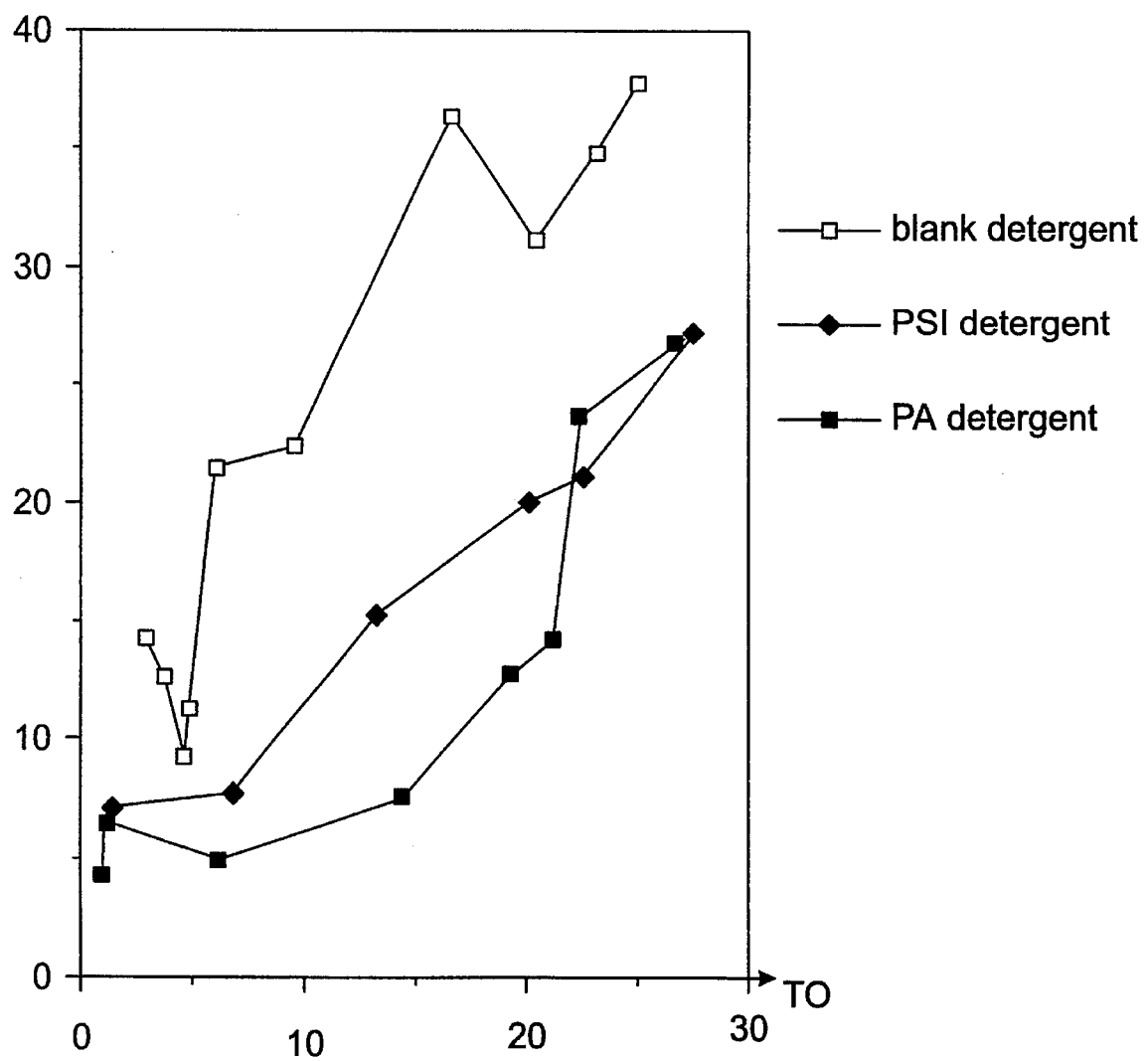
FIG. 2 is a graph illustrating variation in "filming" in terms of hardness of the wash water in the presence or absence of a detergent composition of the invention.

Two preliminary tests were conducted: a first test without detergent, enabling the effect of the water alone on the filming to be discerned. The second test involved a detergent without polymer. The detergent concentration was 5 g/l (50 g for an amount of water of 10 liters per wash). The results are shown in FIG. 2.

EXAMPLE 12

Preparation of a polyimide derived from an aspartic acid/ glutamic acid copolymer:

A stainless steel beaker containing 285 g of aspartic acid and 315 g of glutamic acid, which corresponded to 600 g of an equimolar mixture, was placed in an oven which incorporated nitrogen flushing. The mixture was heated to 175° C. for approximately 22 h.

The polymer was then cooled using dry ice. It was ground in an Ultraturax® in suspension in 2.5 l of water.

It was then washed 3 times with 2.5 l of water and thereafter once in 0.5 l of ethanol.

After drying in the oven, 213 g of copolymer were obtained.

EXAMPLE 13

The hydrolysate of the polyimide of Example 12 was tested for its capacity for sequestration of calcium ions, its calcium carbonate-dispersant power and its growth-inhibitory power according to the protocols described, respectively, in Examples 5, 6 and 8.

Table V below reports the results obtained.

TABLE V

| | So mM/g | Log K | Dispersant power ppm | Rate of crystallization (mol/l · s) |
|---|---|---|---|---|
| Example 12 | 1.8 | 3.2 | 250 ppm | $1.3 \times 10^{-8}$ |

EXAMPLE 14

Repeating the procedure described in Example 2, a detergent composition for washing laundry was prepared from the polyimide of Example 12. The inhibitory effects of this detergent on incrustation, the detergent being tested according to the protocol described in Example 4, were as follows:

| Fabrics | T |
|---|---|
| (4) | 30% |
| (8) | 29% |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A storage-stable detergent composition consisting essentially of a surfactant selected from the group consisting of anionic, cationic, nonionic and amphoteric surfactants, and an in situ, wash water-hydrolyzable polyimide formed by homo- or copolymerizing at least one amino acid said polyimide having a COO$^-$ charge density ranging from 0 to $5 \times 10^{-4}$ mol/g thereof and the at least partially biodegradable polypeptide detergent builder hydrolysate thereof having a COO$^-$ charge density of at least $10^{-3}$ mol/g thereof.

2. The detergent composition as defined by claim 1, said polyimide comprising a polycondensate of an amino diacid or precursor thereof.

3. The detergent composition as defined by claim 2, said polyimide comprising a polycondensate of at least one of aspartic or glutamic acid, or precursor thereof.

4. The detergent composition as defined by claim 1, said polyimide having a weight average molecular weight on the order of 2,000 to 10$^7$.

5. The detergent composition as defined by claim 4, said polyimide having a weight average molecular weight ranging from 3,500 to 60,000.

6. The detergent composition as defined by claim 1, comprising from 0.2% to 80% by weight of said polyimide.

7. The detergent composition as defined by claim 6, comprising from 2% to 5% by weight of said polyimide.

8. The detergent composition as defined by claim 6, comprising from 2% to 50% by weight of said surfactant.

9. The detergent composition as defined by claim 8, comprising from 6% to 30% by weight of said surfactant.

10. The detergent composition as defined by claim 1, comprising an anionic detergency surfactant.

11. The detergent composition as defined by claim 1, comprising a nonionic detergency surfactant.

12. The detergent composition a defined by claim 1, comprising an amphoteric detergency surfactant.

13. The detergent composition as defined by claim 1, comprising a cationic detergency surfactant.

14. The detergent composition as defined by claim 1, in powder form.

15. In a process for the washing of a soiled article in a wash water containing a detergent composition, the improvement which comprises, as the detergent composition therefor, the detergent composition as defined by claim 1.

16. A storage-stable detergent composition, comprising at least one surfactant selected from the group consisting of anionic, cationic, nonionic and amphoteric surfactants, and at least one polyimide formed by (a) homopolymerizing aspartic or glutamic acid, or (b) copolymerizing at least one amino diacid selected from the group consisting of aspartic and glutamic acid, with at least one amino acid selected from the group consisting of glycine, alanine, valine, leucine, isoleucine, phenylalanine, methionine, tryptophan, histidine, proline, lysine, arginine, serine, threonine and cysteine, said polyimide having a $COO^-$ charge density ranging from 0 to $5 \times 10^{-4}$ mol/g and the at least partially biodegradable polypeptide detergent builder hydrolysate thereof having a $COO^-$ charge density of at least $10^{-3}$ mol/g;

wherein said composition is suitable as a detergent in aqueous solution and wherein the hydrolysate of said at least one polyimide functions as a detergent builder to improve the performance of said at least one surfactant.

17. The detergent composition as defined by claim 16, said polyimide having a weight average molecular weight ranging from 3,500 to 60,000.

18. The detergent composition as defined by claim 16, comprising from 0.2% to 30% of said polyimide.

19. In a process for the washing of a soiled article in a wash water containing a detergent composition, the improvement which comprises, as a detergent composition therefor, the detergent composition as defined by claim 17.

20. The detergent composition as defined by claim 16, further comprising a phosphate, zeolite, sodium carbonate, nitriloacetic acid, citric acid and/or tartaric acid detergent builder, a corrosion inhibitor, a bleaching agent, an antiredeposition agent, an anti-encrustation agent, a filler material, or mixture thereof.

21. A detergent composition comprising:
   a) from 0.2 to 80 percent by weight polysuccinimide;
   b) from 2 to 50 percent by weight of one or more surfactants; and, in addition to the polysuccinimide,
   c) one or more builders, the total amount of polysuccinimide plus other builders corresponding to approximately 0.2 to approximately 80 percent by weight.

22. The detergent composition of claim 21, wherein: surfactant is present at a level of from about 6 to 30 percent by weight.

23. The detergent composition of claim 22, wherein: polysuccinimide is present at a level of from about 2 to 5 percent by weight.

24. The detergent composition of claim 21, wherein: polysuccinimide is present at a level of from about 2 to 5 percent by weight.

25. The detergent composition of claim 21, wherein: the detergent composition is a laundry detergent composition.

26. The detergent composition of claim 21, wherein: the detergent composition is an automatic machine dishwashing detergent composition.

27. A process of formulating a detergent composition comprising: adding polysuccinimide to a level of from 0.2 to 80 percent by weight of the detergent composition.

28. The process of claim 27, wherein: polysuccinimide is added to a level of from about 2 to 5 percent by weight of the detergent composition.

29. The process of claim 27, wherein: the detergent composition is a laundry detergent composition.

30. The process of claim 27, wherein: the detergent composition is an automatic machine dishwashing detergent composition.

* * * * *